(12) United States Patent
Harvey

(10) Patent No.: US 8,079,391 B2
(45) Date of Patent: Dec. 20, 2011

(54) PNEUMATIC TIRE WITH SIDEWALL TREAD PROJECTIONS

(75) Inventor: Delwyn Lovell Harvey, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 729 days.

(21) Appl. No.: 12/193,922

(22) Filed: Aug. 19, 2008

(65) Prior Publication Data

US 2010/0043934 A1 Feb. 25, 2010

(51) Int. Cl.
*B60C 11/01* (2006.01)
*B60C 13/02* (2006.01)
(52) U.S. Cl. ............... 152/209.16; 152/209.12; 152/523
(58) Field of Classification Search ............. 152/209.12, 152/209.16, 523, 209.1; B60C 11/01, 13/02
See application file for complete search history.

(56) References Cited

U.S. PATENT DOCUMENTS

| | | | | |
|---|---|---|---|---|
| 4,044,810 A | * | 8/1977 | Taniguchi et al. | 152/209.14 |
| 6,189,586 B1 | * | 2/2001 | Guidry | 152/209.15 |
| 6,533,007 B1 | | 3/2003 | McMannis | 152/209.16 |
| 6,920,906 B2 | * | 7/2005 | Allison et al. | 152/209.16 |
| D578,954 S | * | 10/2008 | Harvey et al. | D12/512 |
| 7,784,511 B2 | * | 8/2010 | Harvey et al. | 152/209.8 |

FOREIGN PATENT DOCUMENTS

| | | |
|---|---|---|
| EP | 1 093 939 A | 4/2001 |
| WO | 99/52720 A | 10/1999 |
| WO | 03/020538 A | 3/2003 |

OTHER PUBLICATIONS

European Search Report—completed Dec. 10, 2009.
U.S. Appl. No. 11/803,358, filed May 14, 2007, Harvey, et al.
U.S. Appl. No. 11/803,359, filed May 14, 2007, Luecke, et al.
U.S. Appl. No. 29/317,739, filed May 6, 2008, Harvey, et al.

* cited by examiner

*Primary Examiner* — Katarzyna Wyrozebski Lee
*Assistant Examiner* — Philip N Schwartz
(74) *Attorney, Agent, or Firm* — Robert N. Lipcsik

(57) ABSTRACT

A pneumatic tire includes a circumferential tread disposed between opposing tread edges and opposing sidewalls disposed radially inward from the opposing tread edges. Each sidewall has a rectangular extension block and a triangular extension block. The rectangular extension block protrudes axially outward by a first amount. The triangular extension block protrudes axially outward by a second amount. The first amount is less than the second amount.

8 Claims, 5 Drawing Sheets ic # PNEUMATIC TIRE WITH SIDEWALL TREAD PROJECTIONS

FIELD OF THE INVENTION

The present invention relates to a pneumatic tire, and more particularly, to a pneumatic tire having tread projections in the tire sidewalls.

BACKGROUND OF THE INVENTION

In a conventional pneumatic tire, such as a conventional high-performance tire, a tread pattern is generally formed by combining circumferential grooves extending in the circumferential direction of the tire with a plurality of grooves inclined relative to the circumferential direction. The combination of grooves forms a plurality of tread blocks along the radially outer surface of tire. If the inclined grooves do not extend completely across the equatorial plane of the tire, a central rib may also be formed in the tread.

Certain conventional vehicles can be used both for commuting over paved highways and, also, for recreational use in off-highway situations. Such vehicles often take the form of pick-up trucks or small general purpose motor vehicles with four wheel drive capability. Such vehicles present a particular challenge to a tire designer because the performance characteristics desired for highway use usually require tradeoffs with the performance characteristics for off-road use. For example, some of these tradeoffs may be mud traction versus treadwear, off-road handling versus on-road handling, and wet traction versus dry traction. Furthermore, when an on/off road, all purpose vehicle is used for commuting on paved streets, it is seldom loaded to its full weight capacity. However, when the same vehicle is packed with recreational equipment for off-road use, the tires may be subjected to much greater mechanical loads. It would be desirable for a tire to have the capacity to provide a combination of good characteristics, such adequate treadwear, mud traction, sand traction, on road handling, off road handling, wet traction, and dry traction.

SUMMARY OF THE INVENTION

A pneumatic tire in accordance with the present invention includes a circumferential tread disposed between opposing tread edges and opposing sidewalls disposed radially inward from the opposing tread edges. Each sidewall has a rectangular extension block and a triangular extension block. The rectangular extension block protrudes axially outward by a first amount. The triangular extension block protrudes axially outward by a second amount. The first amount is less than the second amount.

In accordance with another aspect of the present invention, the rectangular extension block defines a rectangular lateral tread surface along the sidewalls.

In accordance with still another aspect of the present invention, the triangular extension block defines a triangular lateral tread surface along the sidewalls.

In accordance with yet another aspect of the present invention, a radially outer, circumferentially extending edge of the rectangular extension block provides sidewall grip and traction during off-road operation of the tire.

In accordance with still another aspect of the present invention, the radially outer, circumferentially extending edge of the rectangular extension block is inclined relative to the circumferential direction of the tire in the range of 0° to 40°.

In accordance with yet another aspect of the present invention, the rectangular extension block protrudes axially 6-8 mm away from each sidewall.

In accordance with still another aspect of the present invention, the triangular extension block has a radially and axially extending outer circumferential edge, a radially extending edge, and a circumferentially extending edge.

In accordance with yet another aspect of the present invention, the radially and axially extending edge and the radially extending edge of the triangular extension block provide sidewall grip and traction during off-road operation of the tire.

In accordance with still another aspect of the present invention, the triangular extension block has a length such that a terminal point of the triangular extension block is radially aligned with an end of a corresponding elongated extension block.

In accordance with yet another aspect of the present invention, an axially outermost portion of the triangular extension block protrudes axially 8-10 mm away from each sidewall.

In accordance with still another aspect of the present invention, the rectangular extension block protrudes axially 7 mm away from each sidewall.

In accordance with yet another aspect of the present invention, an axially outermost portion of the triangular extension block protrudes axially 8 mm away from each sidewall.

In accordance with still another aspect of the present invention, each sidewall includes a radially extending block interposed between circumferentially adjacent rectangular extensions blocks and circumferentially aligned with, and extending directly from, tread elements of the tread.

In accordance with yet another aspect of the present invention, the circumferentially extending edge of the triangular extension has a maximum circumferential length of a pitch length, the pitch length being the circumferential length between adjacent triangular extensions.

DEFINITIONS

The following definitions are controlling for the disclosed invention.

"Axial" and "axially" are used herein to refer to lines or directions that are parallel to an axis of rotation of the tire.

"Centerplane" means the plane perpendicular to the tire's axis of rotation and passing through the center of its tread.

"Circumferential" means lines or directions extending along the perimeter of the surface of the annular tire parallel to the Centerplane and perpendicular to the axial direction.

"Radial" and "radially" are used to mean directions radially toward or away from an axis of rotation of the tire.

BRIEF DESCRIPTION OF THE DRAWINGS

The invention will be described by way of example and with reference to the accompanying drawings in which.

DETAILED DESCRIPTION OF AN EXAMPLE OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
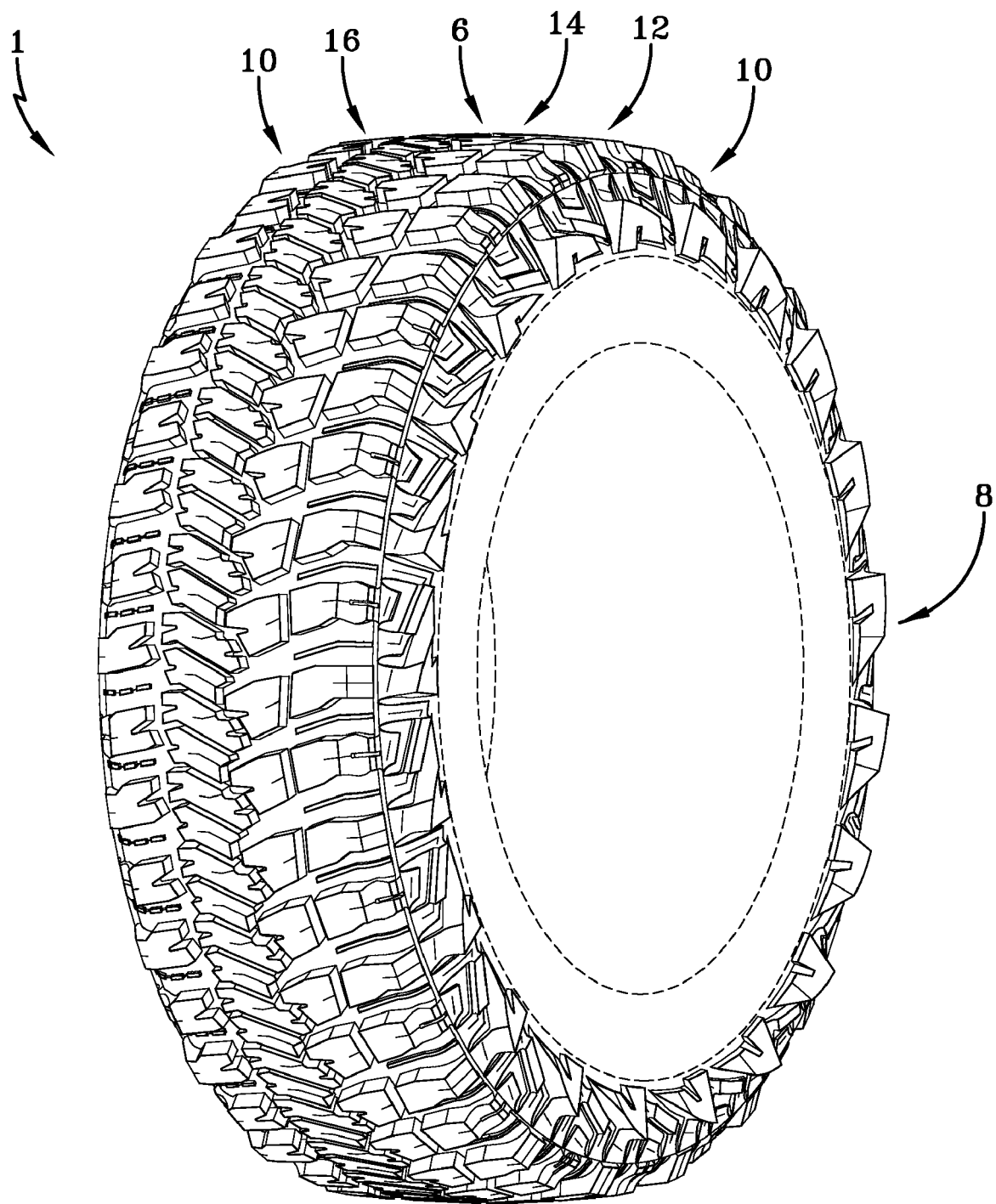
FIG. 1 is a schematic perspective view of a tire in accordance with the present invention.
Figure 5:
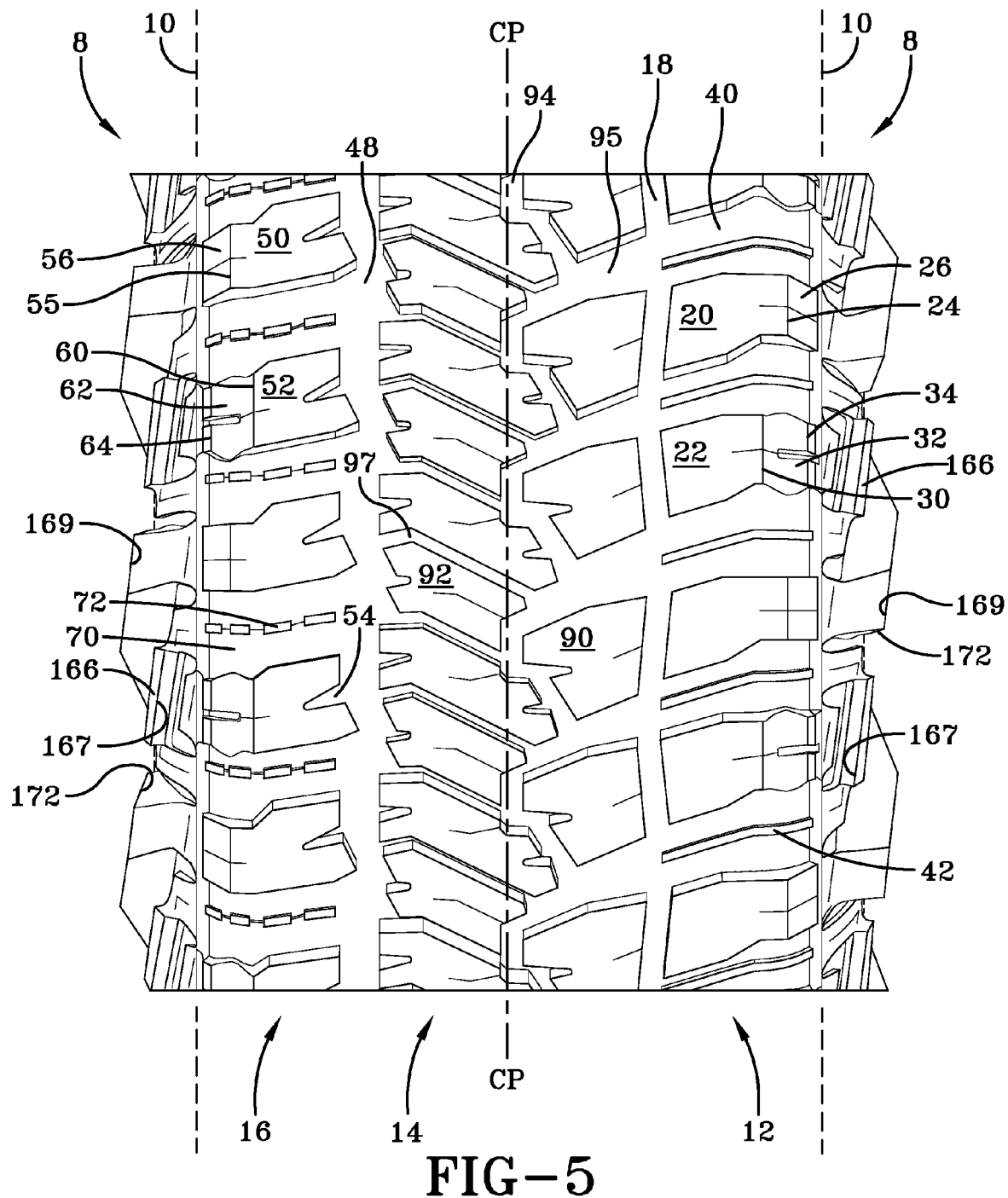
FIG. 5 is a schematic enlarged front elevation view of the tire of FIG. 1.

FIG. 1 illustrates an example pneumatic tire 1 for use with the present invention. The pneumatic tire 1 has a tread 6 and sidewalls 8. An enlarged frontal view of the tread 6 is illustrated in FIG. 5. The example tire 1 has an asymmetric tread 6 located between a pair of opposing tread edges 10. The sidewalls 8 are axially outward and radially inward of the tread edges 10. The example tread 6 has a plurality of traction elements in three defined tread regions: a first edge region 12, a central region 14, and a second edge region 16. In each tread region 12, 14, 16, the traction elements are distinct from the traction elements in the other tread regions.

The first edge region 12 of the tread 6 extends axially inward from the first tread edge 10 (FIG. 5). Initiating at a circumferential groove 18 are circumferentially adjacent blocks 20, 22. The overall block configuration of each block 20, 22 is similar, with a ground engaging portion of circumferentially adjacent blocks alternating in an axially wide 20, narrow 22 pattern. The axially inner edges of the blocks 20, 22 are aligned, but inclined oppositely. An axially outer edge 24 of each wider width block 20 connects to a radially extending surface 26 that is flush, or mergers, with the tire sidewall 8. The narrower width blocks 22 have an axially outer edge 30 that is axially inward of the tread edge 10, and flows into a portion 32 having a radially inward curved surface. The portion 32 is connected to a radially extending surface 34 flush with the sidewall 8.

Between each tread block 20, 22 is a relatively wide lateral groove 40. The lateral groove 40 may be inclined at an angle in the range of 45° to 90°, relative to the tire centerplane CP. Within each lateral groove 40 is at least one mud ejection element 42. The ejection elements 42 may be centrally located within the lateral groove 40 to provide protection to the base of the lateral groove 40.

The second edge region 16 of the tread 6 extends axially inward from the second tread edge 10 (FIG. 5). Initiating at a circumferential groove 48 are circumferentially adjacent blocks 50, 52. The overall block configuration of each block 50, 52 is similar, with a ground engaging portion of circumferentially adjacent blocks alternating in an axially wide 50, narrow 52 pattern. The axially inner edges of the blocks 50, 52 have axially extending notches 54 opening into the circumferential groove 48. An axially outer edge 55 of each wider width block 50 connects to a radially extending surface 56 that is flush, or mergers, with the tire sidewall 8. The narrower width blocks 52 have an axially outer edge 60 that is axially inward of the tread edge 10, and flows into a portion 62 having a radially inward curved surface. The portion 62 is connected to a radially extending surface 64 flush with the sidewall 8.

Between each tread block 50, 52 is a relatively wide lateral groove 70. The lateral groove 70 may be inclined at an angle in the range of 45° to 90°, relative to the tire centerplane CP. Within each lateral groove 70 is at least one mud ejection element 72. The ejection elements 72 may be centrally located within the lateral groove 70 to provide protection to the base of the lateral groove 70.

Between the circumferential grooves 18, 48, the central region 14 of the tread 6 has two rows of circumferentially blocks 90, 92 separated by a circumferential groove 94 (FIG. 5). The blocks 90 are separated by relatively wide transverse grooves 95. The blocks 92 are separated by relatively narrow transverse grooves 97.

Figure 2:
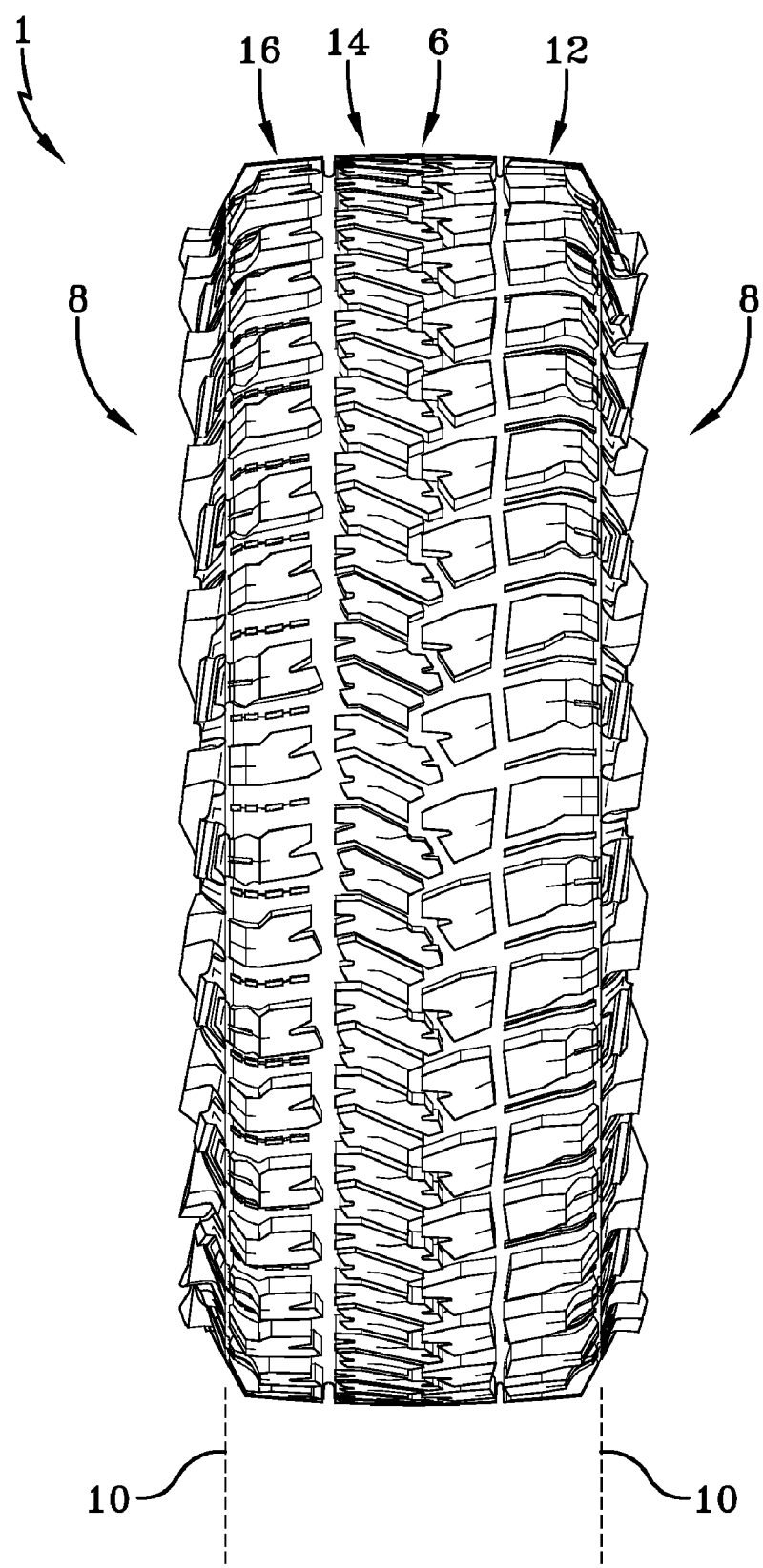
FIG. 2 is a schematic front elevation view of the tire of FIG. 1.

In accordance with the present invention, along the radially outer portion of each sidewall 8, aligned with and spaced radially inward of the tread blocks 22, 52 with curved portions 32, 62, is a series of elongated generally rectangular, or rhomboid, extension blocks 166 (FIGS. 3 & 4) defining a rectangular, or rhomboid, surface corresponding to the outer surface of the sidewall 8. The rectangular surfaces of the rectangular extension blocks 166 thus extend axially outward as the rectangular surfaces extend radially inward (FIGS. 2 & 5). The extension blocks 166 have a predominate length in the circumferential direction of the pneumatic tire 1 and the predominate length may be inclined relative to the circumferential direction of the tire in the range of 0° to 40° to define a generally rectangular, or rhomboid, lateral tread surface.

A radially outer, circumferentially extending edge 167 of each extension block 166 provides additional sidewall grip and traction during off-road operation of the vehicle, such as rock climbing. The elongated extension blocks 166 may extend axially outward from the sidewall 8 between 6-8 mm for further protecting the sidewalls 8 against puncture during off-road operation of the vehicle, such as rock climbing. Experimental analysis has revealed that about 7 mm has produced a unique and unexpected advantage over conventional sidewall designs and dimensions.

Between circumferentially adjacent elongated extensions blocks 166 and aligned with, and extending directly from, each of the tread blocks 20, 50 is a radially extending, generally square, block 164. The radially extending block 164 has a radial length greater than the adjacent extension blocks 166. At a radially inner end of each block 164 is a triangular extension block 168 that passes under each elongated extension block 166 to define a triangular surface angled oppositely relative to the centerplane CP than the rectangular surfaces.

Figure 3:
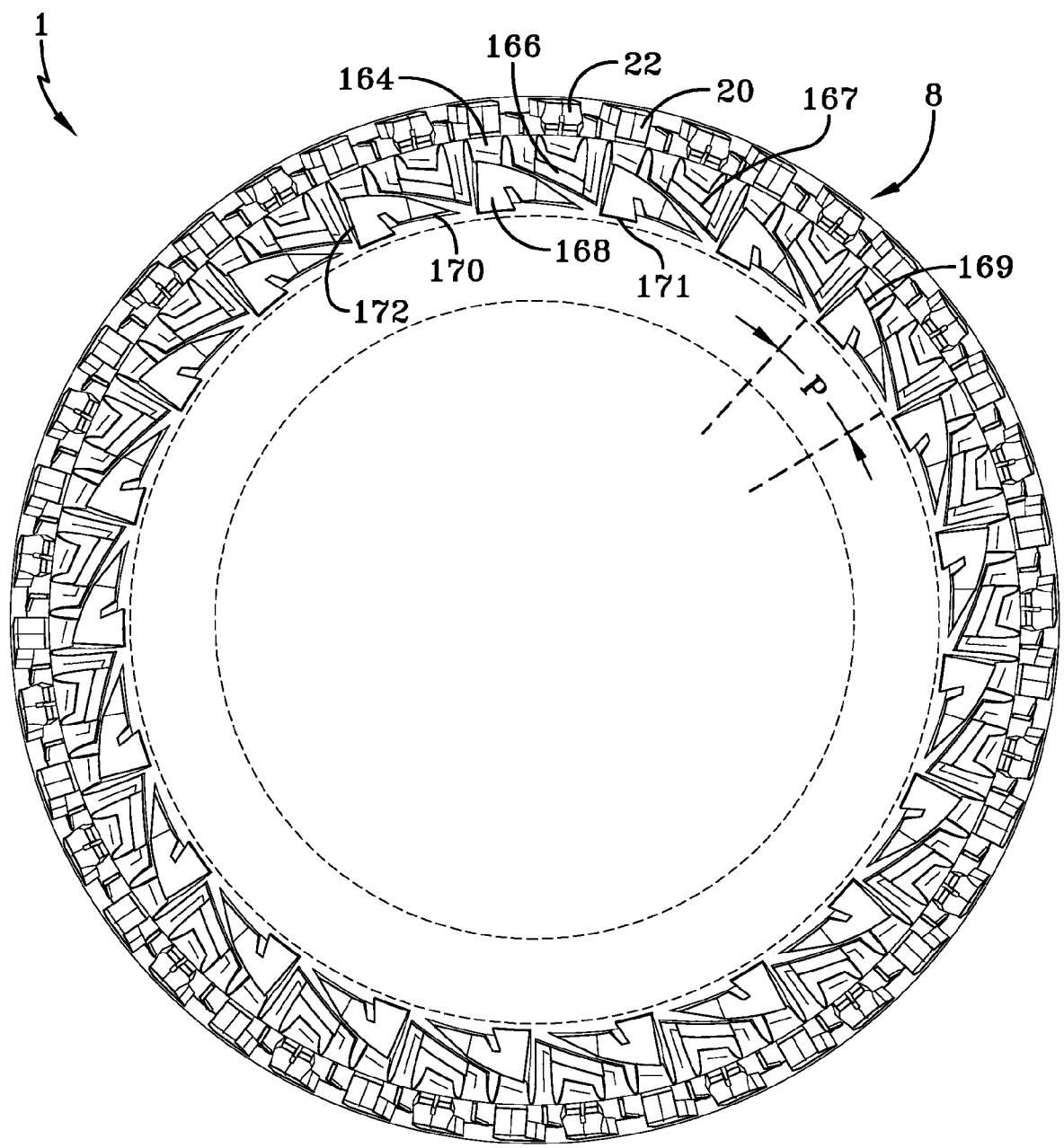
FIG. 3 is a schematic right side elevation view of the tire of FIG. 1.
Figure 4:
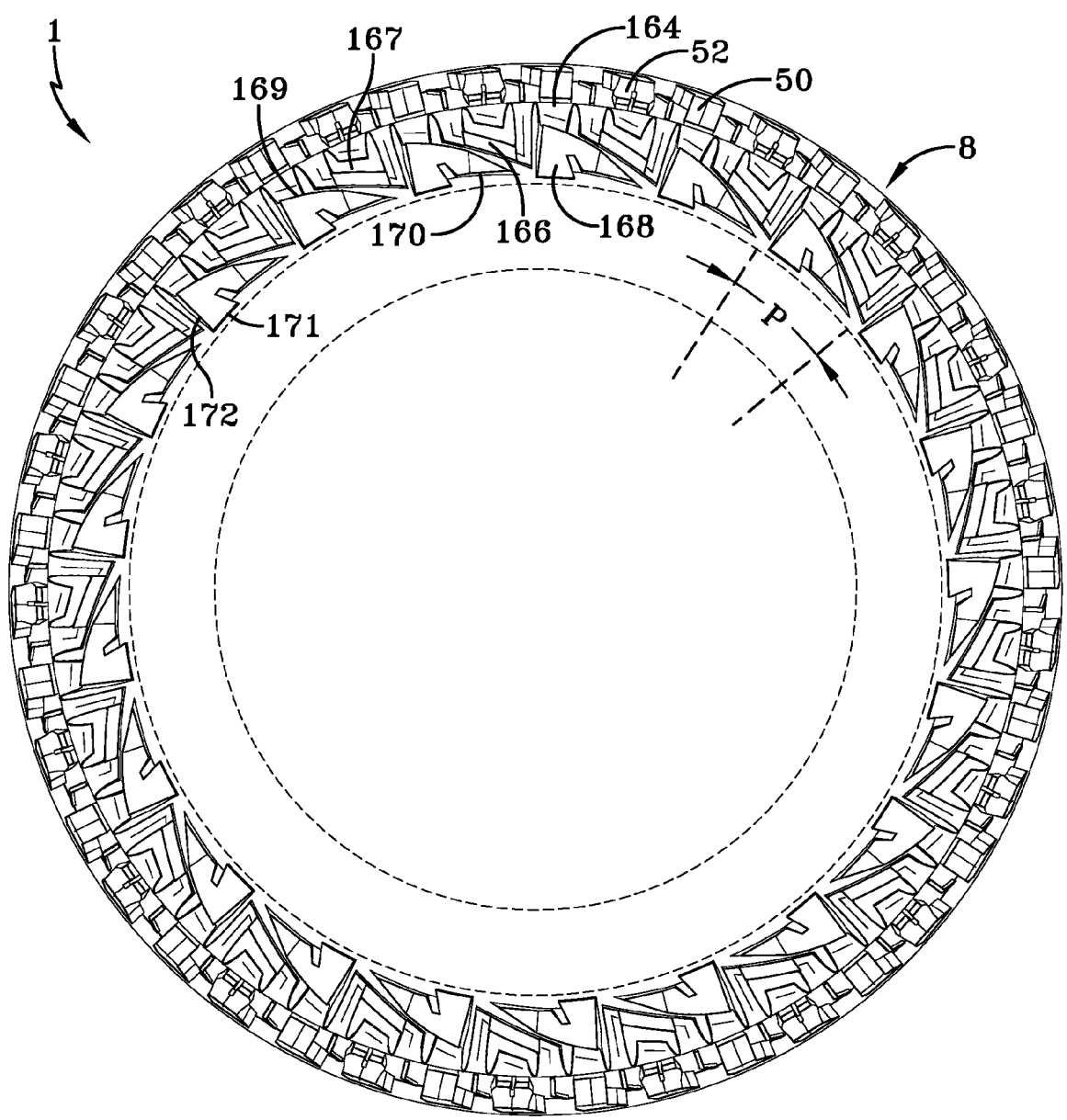
FIG. 4 is a schematic left side elevation view of the tire of FIG. 1.

The triangular surfaces of the triangular extension blocks 168 thus extend axially inward as the triangular surfaces extend radially inward (FIGS. 2 & 5) to define a triangular lateral tread surface. The triangular extension blocks 168 have a length such that the terminal point 170 of the triangular extension block is at least radially aligned with a far end of the corresponding elongated extension block 166 (FIGS. 3 & 4). The triangular extension blocks 168 may have a circumferential length as long as the full pitch length P between repeating sidewall elements.

Each triangular extension block 168 has a radially and circumferentially extending outer circumferential edge 169, a radially extending edge 172, and a circumferentially extending edge 171. The radially and circumferentially extending edge 169 and the radially extending edge 172 of each triangular extension block 168 further provide additional sidewall grip and traction during off-road operation of the vehicle, such as rock climbing. The circumferentially extending edges 169 of the triangular extension blocks 168 extend axially outward from the sidewall 8 between 8-10 mm for protecting the sidewalls 8 against punctures during off-road operation of the vehicle, such as rock climbing. Experimental analysis has revealed that about 8 mm has produced a unique advantage over conventional sidewall designs and dimensions.

The triangular extension blocks 169 may be tapered/chamfered across two surfaces. The primary taper is from the radially and circumferentially extending edges 169 radially inward toward the circumferentially extending edges 171 to an axial distance of about 1 mm from the sidewall 8. The secondary taper forms a radial edge and extends circumferentially toward the terminal point 170 also to an axial distance of about 1 mm from the sidewall 8.

What is claimed is:

1. A pneumatic tire comprising:
 a circumferential tread disposed between opposing tread edges; and opposing sidewalls disposed radially inward from the opposing tread edges, each sidewall having a generally rectangular extension block and a triangular extension block, the rectangular extension block protruding axially outward from the sidewalls by a first amount, the triangular extension block protruding axially outward from the sidewalls by a second amount, the first amount being less than the second amount, the generally rectangular extension block defining a generally rectangular lateral tread surface along the sidewalls, the triangular extension block defining a triangular lateral tread surface along the sidewalls, a radially outer, circumferentially extending edge of the generally rectangular extension block providing sidewall grip and traction during off-road operation of the tire, the radially outer, circumferentially extending edge of the generally rectangular extension block being inclined relative to the circumferential direction of the tire in the range of 0° to 40°, the generally rectangular extension block protruding axially 6-8 mm away from each sidewall, the triangular extension block having a radially and axially extending outer circumferential edge, a radially extending edge, and a circumferentially extending edge.

2. The pneumatic tire as set forth in claim 1 wherein the radially and axially extending edge and the radially extending edge of the triangular extension block provide sidewall grip and traction during off-road operation of the tire.

3. The pneumatic tire as set forth in claim 2 wherein the triangular extension block has a length such that a terminal point of the triangular extension block is radially aligned with an end of a corresponding generally rectangular extension block.

4. The pneumatic tire as set forth in claim 3 wherein the triangular extension block protrudes axially 8-10 mm away from each sidewall.

5. The pneumatic tire as set forth in claim 4 wherein the rectangular extension block protrudes axially 7 mm away from each sidewall.

6. The pneumatic tire as set forth in claim 5 wherein the triangular extension block protrudes axially 8 mm away from each sidewall.

7. The pneumatic tire as set forth in claim 6 wherein each sidewall includes a radially extending block interposed between circumferentially adjacent rectangular extensions blocks and circumferentially aligned with, and extending directly from, tread elements of the tread.

8. The pneumatic tire as set forth in claim 7 wherein the circumferentially extending edge of the triangular extension block has a maximum circumferential length of a pitch length, the pitch length being the circumferential length between adjacent triangular extensions.

* * * * *